April 28, 1959     S. D. FREEMAN, JR     2,884,376
METHOD AND APPARATUS FOR CONTACTING FLUID WITH CONTACT MASS
Filed Dec. 22, 1953     4 Sheets-Sheet 1

INVENTOR.
Silas D. Freeman, Jr.
BY Hudson & Young
ATTORNEYS

April 28, 1959  S. D. FREEMAN, JR  2,884,376
METHOD AND APPARATUS FOR CONTACTING FLUID WITH CONTACT MASS
Filed Dec. 22, 1953  4 Sheets-Sheet 2

INVENTOR.
Silas D. Freeman, Jr.
BY
Hudson + Young
ATTORNEYS

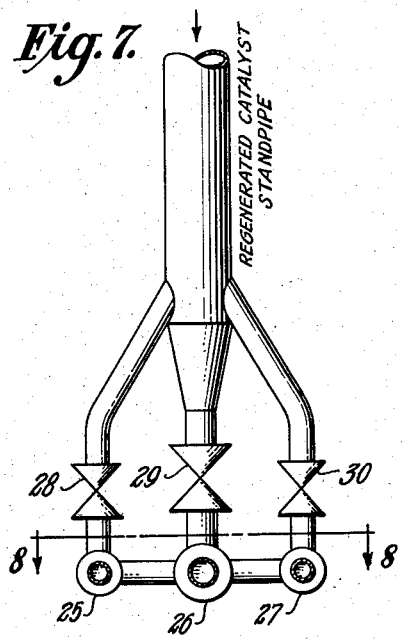
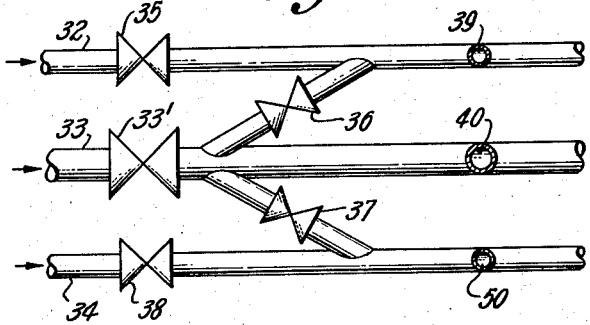
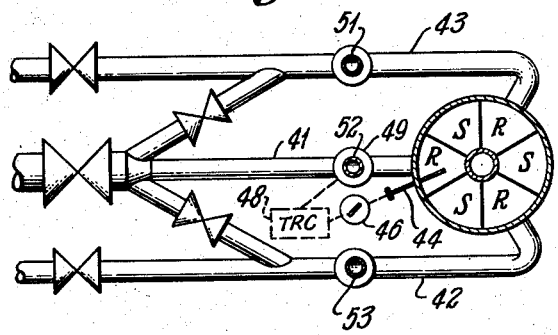
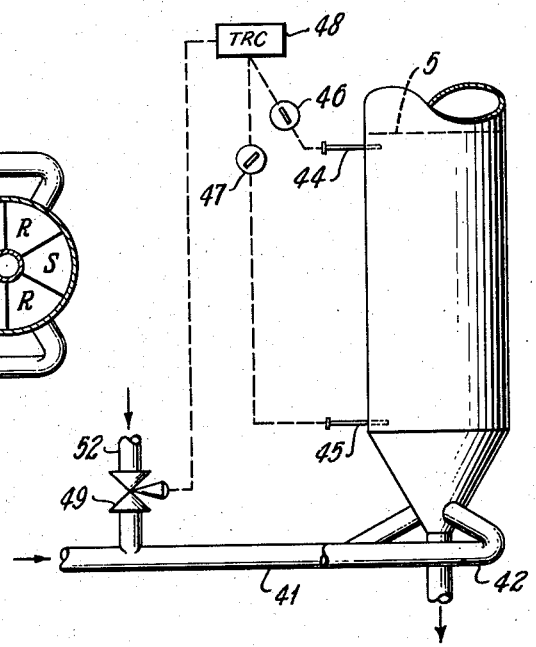

ial No. 399,678

United States Patent Office 2,884,376
Patented Apr. 28, 1959

2,884,376

METHOD AND APPARATUS FOR CONTACTING FLUID WITH CONTACT MASS

Silas Denman Freeman, Jr., Sweeny, Tex., assignor to Phillips Petroleum Company, a corporation of Delaware Application December 22, 1953, Serial No. 399,678

19 Claims. (Cl. 208—147)

This invention relates to the operation of a converter in which a material is contacted with a fluid contact mass or catalyst. Further, the invention relates to an apparatus in which a fluid or vapor can be contacted with a fluid mass of sub-divided particulate contact material or catalyst. In one aspect the invention relates to a method for the operation of a system in which vapors or gaseous materials are contacted with a fluid mass of sub-divided or particulate material or catalyst. In another aspect, the invention relates to the conversion of organic materials, such as hydrocarbons, in fluid conversion systems. In still another aspect, the invention relates to pyrolytic conversion or cracking of a hydrocarbon. In a further aspect still, the invention relates to the contacting of fluid materials with a fluent solid, contact mass or catalyst employing a plurality of contacting sections and a plurality of stripping sections, adapted to strip from the contact mass or catalyst materials which have been contacted therewith, the said contacting and the said stripping sections being arranged within a common zone or vessel within which there is disposed a contact mass transfer section which transfers contact mass from a contacting section to a stripping section and in which zone stripping fluid employed in the stripping sections is removed from the stripping sections to a place outside said zone and is prevented from entering any contacting section by maintaining in said transfer section a head of contact mass sufficient to overcome the pressure of said stripping fluid. Still another aspect of the invention relates to the conversion of a plurality of stocks employing separate catalyst streams within separate sections in a common zone until each stock has been given a desired separate conversion, at a desired temperature, which can be accomplished by proportioning the stock and catalyst streams, and then combining the catalyst and stock streams for further conversion within a common section of said zone following which the catalyst and converted stocks are separated by transferring catalyst through a catalyst transfer section communicating with said common conversion section and separate stripping sections within said zone while maintaining a sufficient pressure of said catalyst in said transfer section to prevent stripping medium employed within said stripping sections from entering into said transfer section. In a still further aspect of the invention, it relates to a control of temperature in separate conversion sections of a fluids contacting zone by proportioning flow of fluid contacting mass or catalyst into materials to be contacted therewith in said zones responsive to at least one temperature within at least one of said zones. In still a further aspect of this invention, it relates to the provision of a fluids contacting vessel containing vertically disposed partitions extending from an internally disposed transfer section to the periphery of said vessel and extending a substantial length of said vessel from the bottom toward the top thereof but not completely to the top thereof, alternate sections formed by said partitions being closed across the tops of said partitions and remaining sections being open into the top of said vessel, said transfer section also being open into the top of said vessel, said transfer section having a first opening along its length into at least one of said sections formed by closure across the tops of the partitions forming the same, a partition across said transfer section at a place below said opening, a further opening from said section formed by closure across the tops of the partitions forming the same into said transfer section below said partition across said transfer section, said transfer section below said last-mentioned opening thereinto communicating with the outside of said vessel, a conduit communicating the exterior of said vessel with the bottoms of each of the said sections remaining open to the top of said vessel, a conduit communicating the exterior of said vessel with the bottom of each of said sections closed at the tops of the partitions forming the same, a conduit communicating the exterior of said vessel and the tops of each of said sections formed by closure across the tops of the partition forming the same and a conduit communicating the top of said vessel with the exterior.

According to this invention there is provided a method for the contacting of a charge stock with a fluid contacting material within a zone, the lower portion of which is sub-divided into a contacting section, a stripping section, and a transfer section, the upper portion of said contacting zone being in open communication with said contacting section and said transfer section, said transfer section being in open communication with said stripping section at an upper and a lower locus of said transfer section, said transfer section being blocked intermediate said loci, the lower end of said transfer section communicating with the exterior of said zone, said zone communicating with the exterior at its upper end, said contacting section communicating with the exterior at its lower end, said stripping section communicating with the exterior at its lower and at its upper end which comprises passing said charge stock and contacting materials suspended therein upwardly through said contacting section into the upper portion of said zone, maintaining in the upper portion of said zone a bed of said fluid contacting material, removing contacted charge stock from the top of said zone, passing contacting material downwardly from the bottom of said bed through said transfer section and said first-mentioned opening into said stripping section, said opening being at a distance below said bed sufficient to maintain a pressure of contacting material in said transfer section sufficient to prevent stripping medium employed in said stripping section from entering through said first-mentioned opening into said transfer section, stripping said contacting material in said stripping section by introducing stripping medium into the bottom of said stripping section and withdrawing stripping medium from the top of said stripping section, passing stripped contacting material through said second-mentioned opening into said transfer section and therefrom through the bottom of said zone to the exterior thereof.

Also, according to the invention by controlling the proportion of charge stock to contact or catalyst mass in each of the said sections of said zone it is possible to control the effective change in said charge stock. For example, when converting a hydrocarbon, the contact mass will be at a conversion temperature, supplying the heat of conversion, and the proportion of the contact mass will determine, at least in part, the amount or nature of the conversion. In another application of the invention the contact mass can be at a desired temperature to cause conversion but cool enough to absorb exothermic heat of reaction when such heat is evolved.

Still, according to the invention, the provision of several sections permits the individualized application of reaction conditions to different charge stocks. For example, in one section an oil can be cracked while in another section a hydrocarbon gas can be polymerized.

The two converted streams can then be brought together for a brief interreaction in the upper portion of the said zone. It will be recognized that the exothermic polymerization reaction will supply heat to the contact mass bed in the upper portion of said zone to make up for the heat absorbed by the cracking reaction.

Also, according to the invention, the temperature of a stream of charge stock and catalyst or contact mass passing through one section can be controlled by the temperature, nature and amount of stripping medium flowing through said stripping section.

Still further, according to the invention, the temperature of each charge stock, or the charge to each section, can be controlled by the proportioning the charge stock and catalyst responsive to the temperature at any point or points in the system, for example in said section or sections, respectively, or in the bed maintain thereabove.

Also, according to the invention, an apparatus, suited to the carrying out of the method of the invention, has been set forth.

Figure 1 of the drawing shows an elevational cross-section of a vessel arranged according to the invention and depicts the general arrangement of a slotted central downcomer pipe within the vessel which in the annulus formed by insertion of said pipe is sub-divided into a plurality of sections, some of which are conversion sections and some of which are stripping sections. As shown, each stripping section is formed between conversion sections and each conversion section is formed between stripping sections. The downcomer pipe is slotted at at least two levels, the slots communicating the interior of said pipe with the stripping sections. The higher level slots are at a level sufficiently below the catalyst bed level to provide a catalyst head pressure sufficient to prevent the flow of stripping medium into the downcomer pipe. The lower level slots are at or near the bottom of the pipe and serve to collect the stripped catalyst into the pipe for withdrawal thereof from the vessel. The pipe is blocked off at a level below the upper slots to prevent short cutting of the stripping sections by the catalyst. Figure 1 shows the cross-sectional cut taken through two stripping sections on line 1—1 of Figure 2.

Figure 7 shows piping and valving of a regenerated catalyst standpipe down through which regenerated catalyst passes on its way to conversion sections of a vessel as shown in Figure 1. Material to be converted or contacted is injected into the catalyst or contact mass immediately preceding the valves, as described later herein.

Figure 8 shows a piping and valving arrangement for feeding material and contact mass into separate conversion sections of a vessel as shown in Figure 1. In this arrangement, different charge stocks can be used, as later described.

Figures 9a and 9b show a temperature control arrangement. Figure 9a shows a horizontal view of piping and valving arrangement at the foot of a vessel as in Figure 1, the vessel being shown as in Figure 2, R's being reaction zones and S's being stripping zones. Figure 9b shows a vertical view locating thermocouples responsive to which one valve 49 is controlled, only one valve being connected to thermocouples for sake of simplicity.

Figure 1:
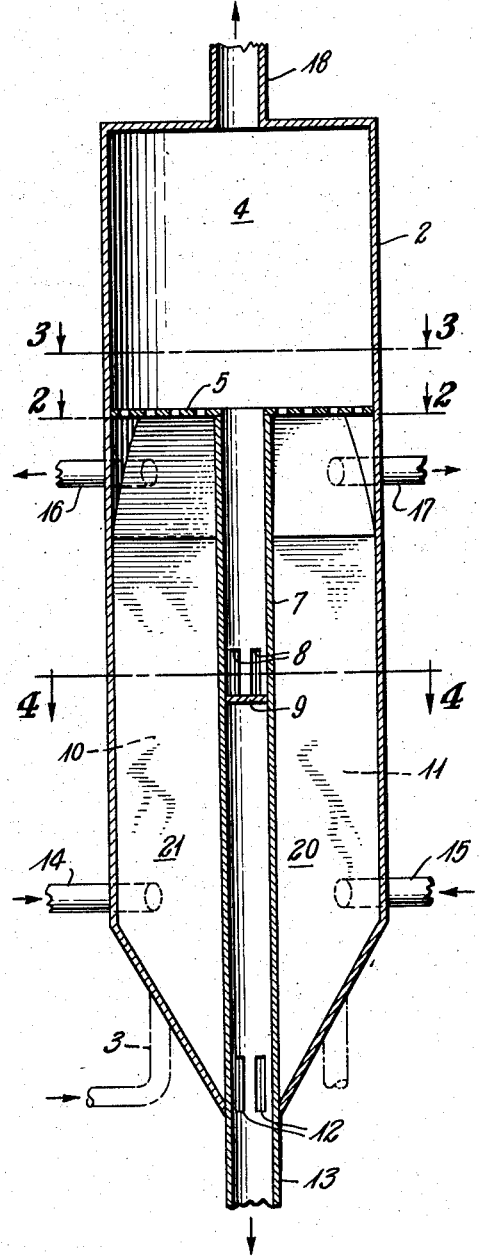
Figure 10:
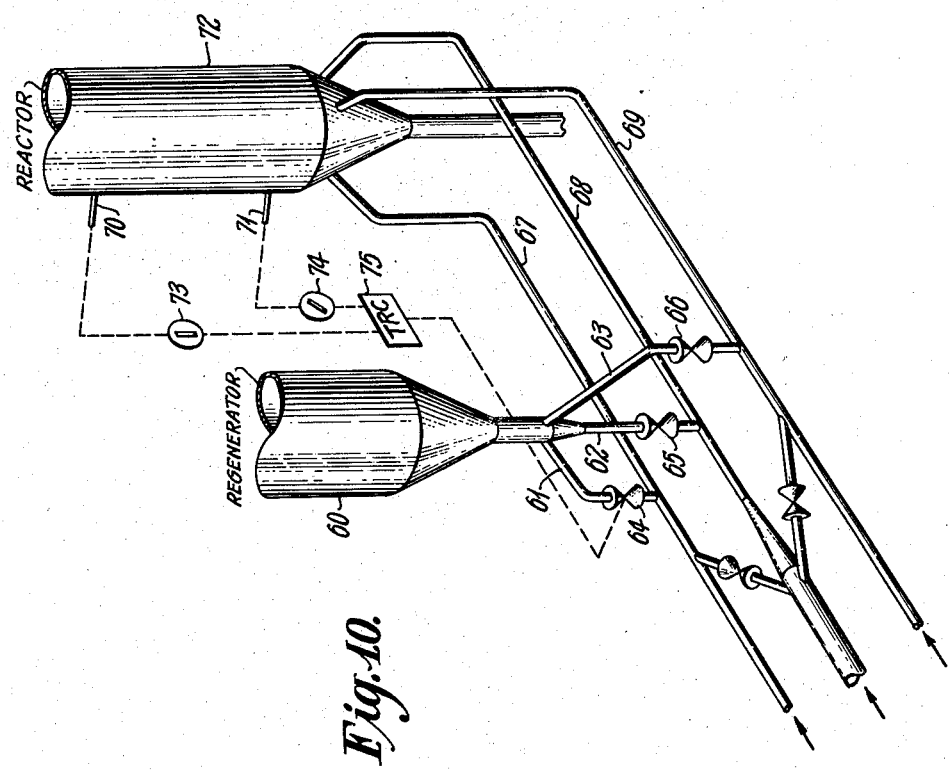

Figure 10 shows a perspective view of a portion of a catalyst regenerator connected, by piping and valving as described, to a vessel as shown in Figure 1. Control of at least one slide or other valve at the foot of the regenerator responsive to temperature in at least one locus of a reactor section is also shown.

Referring now to the drawings, in Figure 1 a material to be contacted, say, a hydrocarbon oil to be cracked in vapor phase by admixture with hot fluid particulate catalyst, is admixed with an appropriate contact mass at a proper temperature and passed into vessel 2 through conduit 3 and upwardly through a contacting section C (Figure 2) into the bed of contact material 4 above grid 5. The bed is maintained, as understood in the art, by supplying additional fluids and catalyst thereto by way of conduit 3 and section C and withdrawing therefrom, at a rate equal to that of the supply thereto of contact mass, of contact mass for stripping and regeneration. The converted material which is in the vapor or gas phase passes out through the top of vessel 1 by way of line 18. Suitable cyclone or other separation means, not shown, can be employed in the top of vessel 1 to prevent entrainment of fines of the contact material.

The withdrawal of contact mass from the bed above the grid 5 is effected by means of contact material transfer section or pipe 7 down through which the contact mass is flowed until it reaches slots 8. The presence of blocking partition 9 coacts with slots 8 to cause the contact mass to flow into stripping sections 10 and 11 ("S" in Figure 2). From sections 10 and 11, the contact mass flows into transfer section or pipe 7 through slots 12 and out the bottom of the vessel through pipe 13 to a suitable regenerator, or other place, as desired.

Steam or other stripping and/or heating or cooling medium is passed into sections 10 and 11 through pipes 14 and 15 and passes upwardly, stripping from the contact mass, as it flows downwardly, any entrained hydrocarbon or other contacted material which with the stripping medium passes out through pipes 16 and 17, respectively. The weight of contact mass in the upper section of pipe 7, above the slots 8, is arranged to be sufficient to prevent stripping medium from admixing with the material being contacted in bed 4 and passing into contaminating contact and admixture with the products taken overhead through pipe 18.

This avoidance of contamination is of especial importance when the products contain valuable gases, for example, ethylene, from which separation of such stripping medium would be difficult, involved and expensive.

The apparatus of the present invention can be constructed of any suitable material, for example, steel, refractory elements such as brick, etc.

In the embodiment illustrated in Figure 1, the stripped catalyst enters the ports 12 before leaving the vessel 2. It is possible, of course, to remove stripped contact mass directly from the bottoms of the stripping sections and then to combine the individually removed streams of contact mass, if desired.

As a further advantage of the invention, it is noted that the radially and alternately disposed sections can be designed to have approximately the same volumes so that the contacting mass is subjected to no compression or expansion whenever such a condition is desired to be avoided to secure the recognized advantages of uniform flow.

Figure 3:
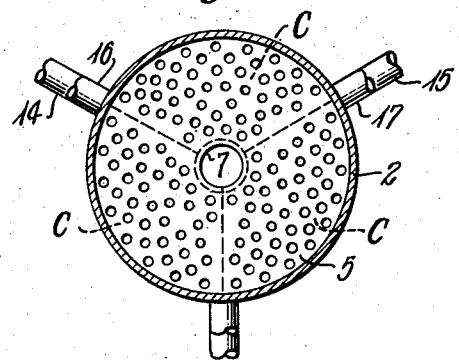
Figure 3 is a horizontal cross-section of Figure 1 taken along line 3—3 which is just above the grid above which there is a common catalyst or contact mass maintained in a dense phase fluid bed and from which catalyst is withdrawn through the central downcomer pipe to which reference has been made.
Figure 2:
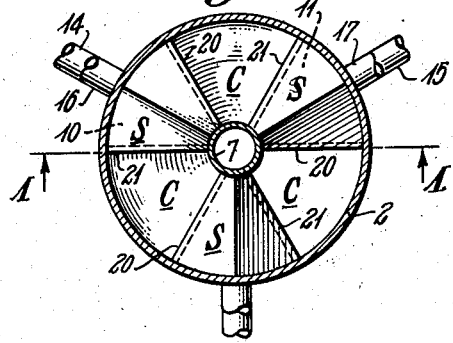
Figure 2 is a horizontal cross-section of Figure 1 taken along the line 2—2 and shows the alternate charge conversion and stripping sections marked "C" and "S" respectively.
Figure 4:
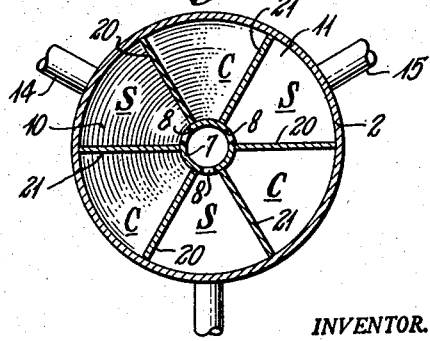
Figure 4 is a horizontal cross-section view of Figure 1 taken along line 4—4 and through slots 8.

In operation, for example, when cracking hydrocarbons to produce gasoline employing, for example, a silicaalumina catalyst, the head of catalyst flowing down through the upper portion of pipe 7 and out through slots 8 possesses a sufficient pressure to prevent the stripping gas which may be a spent combustion gas from passing inwardly from sections 10 and 11 through slots 8 and upwardly through pipe 7. In one modification, it is found cheaper to cause a small flow of hydrocarbon vapors downwardly through pipe 7 and out through slots 8 than to allow spent combustion gases to commingle with the converted hydrocarbon vapors passing out from vessel 2 through pipe 18. Figures 2 and 3 have already been described. Figure 2 shows the alternate arrangement of sections closed across the tops of the partitions forming the same. The stripping sections S are closed at the tops thereof and are formed, each of them, by a partition 20 and a partition 21. According to the invention, it is not necessary to have an even number of stripping sections or an even number of contacting sections nor is it necessary to have a plurality of each. However, it is preferred to have the contacting and stripping sections arranged alternately as shown in Figure 2.

Figure 5:
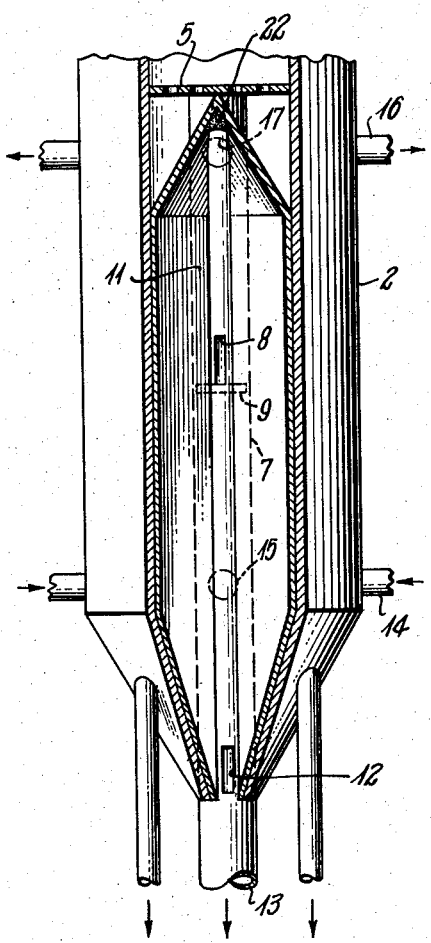
Figures 5 and 6 show how the steam or stripping sections are located below the grid and that as the charge and catalyst travel upwardly, the charge sections widen or diverge, increasing in horizontal cross-sectional area, until, viewed from above, they are represented as in Figure 3 and encompass the entire horizontal area of the described annulus.
Figure 6:
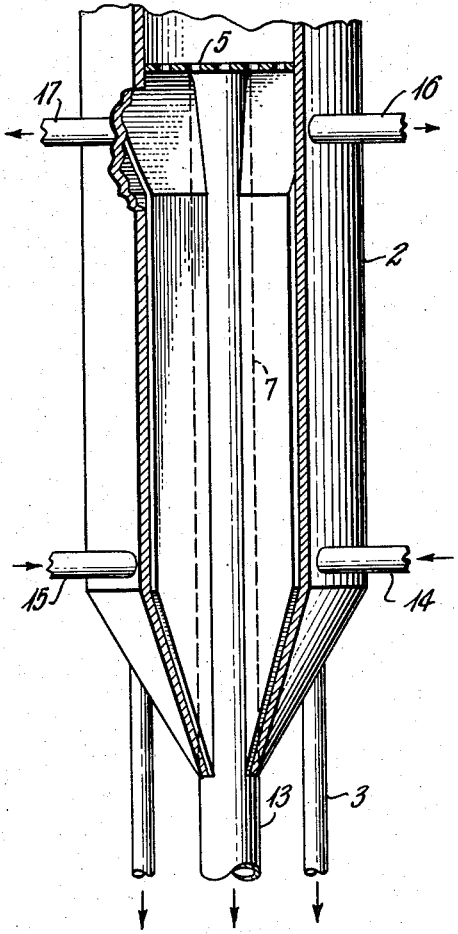

Still further in its preferred form, the transfer pipe 7 is centrally located, thus to form a symmetrical cross-section at line 4—4 and elsewhere below the grid except immediately below the grid at which place, as shown in Figure 6, the charge or contacting sections C are enlarged until at the level of the grid the contacting sections make up the entire horizontal cross-sectional area of vessel 2. Thus, as shown in Figure 3, at the level of the grid, the three contacting sections C have become enlarged until they form all of the cross-sectional area of the vessel at that level. Figure 5 shows a typical stripping section of vessel 2. In Figure 5, slots 8 and 12 are shown. Catalyst coming down pipe 7 will emerge through slot 8 into section 11, will pass down through stripping section 11, and will re-enter pipe 7 below the partition member 9 located in pipe 7. Steam or other stripping medium will pass upwardly through section 11 and out through pipe 17 from the top of section 11 which is otherwise closed to the passage of gaseous materials from the top thereof. In order to protect the top of stripping section from erosion, it is coated or filled with an abrasive resistive material 22, as shown.

In Figure 7, oil which can be a virgin feed stock to be cracked under predetermined conditions of temperature and time is passed into pipes 25, 26, and 27 down into which are passed through slide valves 28, 29, and 30 regenerated catalyst at a predetermined desired conversion temperature. The charge stocks can be separately passed to conversion sections in vessel 2 or, if desired, several arrangements as in Figure 7 can be employed in connection with each conversion section of vessel 2, thus, different proportions of catalyst at a given temperature can be combined with the same or different proportions of the same or different charge stocks for conversion in the same or different temperatures. The flexibility of the arrangement will be obvious to one skilled in the art in possession of this disclosure.

In Figure 8, a somewhat more complex arrangement is shown. In Figure 8, a lighter oil can be passed into pipe 32, a heavier oil can be passed into pipe 33, and a still different oil can be passed into pipe 34. By suitable arrangement of valves 33', 35, 36, 37, and 38, varying quantities of these oils can be intermixed, as shown, in varying proportions with catalyst passing down through slide valves, not shown, in pipes 39, 40, and 50. In Figures 9a and 9b, having noted the arrangements in Figures 7 and 8, there is shown in Figure 9a a valving and piping arrangement leading oil and/or catalyst to the various reactor sections R, thus, to react different amounts of oil and proportions of catalyst in each of said sections before the streams become common above the grid as shown in Figure 9b.

It will be noted that the streams numbered 41, 42, and 43 enter at the bottoms of the sections R and become common above the grid following which separation of products and catalyst will take place as described in connection with vessel 2. Figures 9a and 9b illustrate how the temperature control, for example, with a thermocouple, at 44 and/or at 45 can be effected through selector switches 46 and 47 and temperature regulator control 48 to control valve 49. Only one diagrammed showing of temperature control means is shown in Figures 9a and 9b. It will be understood that each valve shown in catalyst downcomers 51, 52, and 53 can be similarly controlled.

In Figure 10 is shown a combination of the lower portion of a regenerator vessel from which catalyst passes down through temperature control slide valves into oil or other charge stock feed pipes. Thus, regenerated catalyst at a suitable temperature flows from vessel 60 through pipes 61, 62, and 63 through slide valves 64, 65, and 66 into pipes 67, 68, and 69. The proportion of catalyst flowing through the slide valves is controlled by means of thermocouple actuated temperature regulator controller as described in connection with Figures 9a and 9b. Thus, thermocouples 70 and 71, located in a section of reactor 72, can be caused to act through selector switches 73 and 74 to operate temperature regulator controller 75 to control slide valve 64. Similarly, other thermocouples located in other sections of reactor 72 can be employed to control slide valves 65 and/or 66. Oil fed at desired temperatures which can be the same or different, is fed through pipes 67, 68, and 69 at the same or different flow rates, as desired, into the converter sections of reactor 72. The sections are as described in connection with vessel 2 of Figure 1. The operation in reactor 72 is as described in connection with vessel 2 of Figure 1.

It will be obvious to those skilled in the art that the method and arrangement according to the invention possess several-fold advantages. One advantage lies in the flexibility permitting separate pre-treatment of stocks in varying quantities and at different temperatures with separate portions of contact mass or catalyst. Indeed, it is within the scope of the invention to supply separate and different contact masses to each stream of oil or other material to be converted flowing to each of the several converter sections. In the event that different catalysts are employed and it is desired to recover the same for reuse, suitable recovery and sorting means can be adapted to accomplish the desired result. In any event, the method and system here set forth possess the further advantage of temperature control as set out herein, for example, in connection with a combined cracking and polymerization operation the one being endothermic and the other being exothermic, following which a period of time for reaction of the thus converted streams is allowed before separation of catalyst, the exothermic heat being conveyed to the bed to there make up for the endothermic heat which has been absorbed. In the bed there can be conducted reactions which are well-known, for example, alkylation, rearrangement, etc. Other advantages of the arrangement according to the invention are obvious from this disclosure and the drawings.

Reasonable variation and modification are possible within the scope of the foregoing disclosure and the appended claims to the invention, the essence of which is that there have been provided a method which comprises passing upwardly through a lower contacting section of a zone an admixture of a material to be contacted and a fluid contact mass into an upper portion of said zone, maintaining a bed of material to be contacted and fluid contact material in said upper portion of said zone, removing overhead from the top of said zone material which has been contacted with said fluid contact mass, withdrawing from a lower portion of said bed in said upper portion of said zone contacting material through a contact material transfer section located within a lower portion of said zone, passing said contact material from said transfer section into a stripping section also located in a lower section of said zone, stripping said contacting material in said section and withdrawing said stripped contact material from said stripping section, the contacting material in said transfer section being maintained in a quantity sufficient to exert a pressure sufficient to prevent ingress of stripping medium from said stripping section into said transfer section; a temperature controlled by proportioning different amounts of contact mass with the same or different quantities of material to be contacted therewith responsive to at least one temperature in said contacting section and an apparatus for practicing the aforesaid methods.

I claim:

1. A method for the contacting of a fluid with a fluent contacting mass which comprises admixing said fluid with said contacting mass, passing said admixture upwardly through a lower contacting section of a contacting zone into a fluidized bed of said contact mass maintained in an upper portion of said zone entirely above said lower contacting section, removing contacted fluid from said bed and overhead from the top of said zone, withdrawing contacting mass from a lower portion of said bed into a contacting mass transfer section also within the lower portion of said zone, transferring contact mass downwardly through said transfer section as a confined columnar mass into a stripping section also within the lower portion of said zone and entirely below said bed, in said stripping section stripping said contacting mass by passing a stripping medium through said stripping section, and maintaining a vertical head of said particulate contacting mass in said columnar mass sufficient to prevent stripping medium from entering into said transfer section, and maintaining said admixture in said lower contacting section in indirect heat exchange relationship with said stripping medium and said contact mass in said stripping section.

2. A method for the contacting of a vaporous fluid with a fluent, particulate contacting mass in a zone which comprises admixing said fluid with said contacting mass, passing said admixture upwardly through a confined radial contacting section of said zone, annularly disposed in a lower portion of said zone partly around a substantially concentric confined columnar contacting mass in a transfer section in said lower portion of said zone, into a bed of said contacting mass maintained entirely above said contacting section in an upper portion of said zone, continuing the contacting of vaporous fluid and said contacting mass in said zone, withdrawing contacting mass from said bed into said transfer section, transferring contacting mass through said transfer section downwardly into a confined radial stripping section also annularly disposed partly around said transfer section in a lower portion of said zone, in said stripping section stripping entrained fluid with a stripping medium from said contacting mass, maintaining in said transfer section a pressure head of said contacting mass sufficient to prevent flow of fluid from said stripping section into said transfer section, and removing said stripping medium and said vaporous fluid from said zone in separate streams.

3. A method according to claim 2 wherein the fluid is a hydrocarbon and wherein in said contacting zone a catalyst is employed to effect a catalytic conversion of said hydrocarbon and wherein a catalytic conversion of a hydrocarbon is also effected in said bed.

4. A method according to claim 2 wherein a plurality of contacting sections and at least one stripping section are employed and wherein different fluids are charged to each of said contacting sections and therein contacted with contacting mass under different conditions in each of said sections.

5. A method according to claim 2 wherein a plurality of contacting sections and at least one stripping section are employed, the fluid in each contacting section is different from that in any other contacting section, the fluid in each contacting section is a hydrocarbon and is contacted therein and in said bed and the contacting mass is catalytic in character.

6. A method according to claim 2 wherein a small proportion of said fluid contacted with said contacting mass is withdrawn from said bed together with said mass into and through said transfer section.

7. A method according to claim 2 wherein the said fluid pressure is maintained by maintaining filled with fluid contacting mass a substantial vertical length of said concentric contacting mass transfer section.

8. A method according to claim 2 wherein substantially all of the fluid which is contacted with said contacting mass in said bed is taken off overhead of said bed from said zone.

9. A method according to claim 8 wherein the conversion in each section is effected under conditions optimum for the fluid being converted and wherein the temperature condition is adjusted at least partly by proportioning the contacting mass fed to each section in respect of its temperature when it is fed to the said section.

10. A method according to claim 9 wherein the contacting mass is proportioned responsive to the temperature at a point in the said zone.

11. A vessel suitable for the conversion of hydrocarbons employing a fluent particulate contact mass which comprises a shell, an outlet at the top portion of said shell, at least one closed contacting section within a lower portion of said shell, an opening in said contacting section connecting said contacting section with an upper portion of said shell, an inlet to said contacting section, at least one closed stripping section within a lower portion of said shell, said closed contacting section and said closed stripping section defining the bottom of said upper portion and being so constructed and arranged as to maintain a body of fluidized catalyst in said upper section, a contact mass transfer conduit connecting a first point in said upper portion of said shell and a second point in said closed stripping section, said second point being lower than said first point, a vertical distance between said connected points being substantial and sufficient to maintain a head of said particulate contacting mass therein sufficient to prevent upward flow of gaseous fluids in said conduit, an inlet and outlet in said stripping section for stripping medium to strip the contacting mass in said stripping section, an outlet for said stripping section for the removal of stripped contact material therefrom, said stripping section being in communication with said upper portion of said shell only by way of said transfer conduit.

12. A vessel suitable for the conversion of hydrocarbons employing a fluent particulate contact mass which comprises a shell, an outlet in the top portion of said shell, at least one contacting section in a lower portion of said shell, an inlet to said contacting section, at least one stripping section in a lower portion of said shell, a contact mass transfer conduit communicating with a first point in an upper portion of said shell and a second point in said stripping section, said second point being lower than said first point, a distance between said communicated points being substantial and sufficient to maintain a head of said particulate contacting mass therein sufficient to prevent upward flow of gaseous fluids in said conduit, and an inlet and outlet in said stripping section for stripping medium to strip the contacting mass in said stripping section, an outlet for said stripping section for the removal of stripped contact material therefrom, said stripping section being in communication with said upper portion of said shell only by way of said transfer conduit, said contacting and stripping sections being radially disposed about said contact mass transfer conduit in the lower portion of said shell.

13. A vessel suitable for the conversion of hydrocarbons employing a fluent particulate contact mass which comprises a shell, an outlet in the top portion of said shell, at least one contacting section in a lower portion of said shell, an inlet to said contacting section, at least one stripping section in a lower portion of said shell, a contact mass transfer conduit communicating with a first point in an upper portion of said shell and a second point in said stripping section, said second point being lower than said first point, a distance between said communicated points being substantial and sufficient to maintain a head of said particulate contacting mass therein sufficient to prevent upward flow of gaseous fluids in said conduit, and an inlet and outlet in said stripping section for stripping medium to strip the contacting mass in said stripping section, an outlet for said stripping section for the removal of stripped contact material therefrom, said stripping section being in communication with said upper portion of said shell only by way of said transfer conduit, said upper portion of the vessel being determined by the upper ends of the said contacting and stripping sections.

14. A vessel suitable for the conversion of hydrocarbons employing a fluent particulate contact mass which comprises a shell, an outlet in the top portion of said shell, at least one contacting section in a lower portion of said shell, an inlet to said contacting section, at least one stripping section in a lower portion of said shell, a contact mass transfer conduit communicating with a first point in an upper portion of said shell and a second point in said stripping section, said second point being lower than said first point, a distance between said communicated points being substantial and sufficient to maintain a head of said particulate contacting mass therein sufficient to prevent upward flow of gaseous fluids in said conduit, and an inlet and outlet in said stripping section for stripping medium to strip the contacting mass in said stripping section, an outlet for said stripping section for the removal of stripped contact material therefrom, said stripping section being in communication with said upper portion of said shell only by way of said transfer conduit, said transfer conduit extending from substantially the top of said section to substantially the bottom of said vessel and being slotted to provide said communication with said stripping section.

15. A vessel according to claim 14 wherein said conduit is blocked off below a first slot level, also slotted at substantially its lower end and is in open communication at its lower end with the exterior of said vessel.

16. A method for contacting of a first fluid in the gaseous state with a fluent particulate solid contacting mass in a zone which comprises admixing said first fluid with said contacting mass, passing said admixture upwardly through a plurality of distinct, separate confined radial contacting sections, annularly disposed within a lower portion of said zone partly around a substantially concentric confined columnar contacting mass in a transfer section in said lower portion of said zone, into a common bed of said contacting mass maintained entirely above said contacting sections in an upper portion of said zone, continuing the contacting of said first fluid and said contacting mass in said bed, withdrawing contacting mass from said bed into said transfer section, transferring portions of said contacting mass through said transfer section downwardly into a plurality of distinct, separate confined radial stripping sections also annularly disposed partly around said transfer section within a lower portion of said zone, in said stripping sections stripping entrained fluid from said contacting mass with a stripping fluid, and maintaining in said transfer section a head of said solid contacting mass sufficient to prevent flow of fluid from said stripping section into said transfer section, and withdrawing said stripping fluid and said first fluid separately from the said zone.

17. A vessel suitable for the conversion of hydrocarbons employing a subdivided particulate contact mass which comprises a shell, an outlet at the top of said shell, at least one contacting section in a lower portion of said shell, an inlet to said contacting section, at least one stripping section in a lower portion of said shell, a contract mass transfer conduit communicating with a point in an upper portion of said shell and a point in said stripping section, a distance between said communicated points being substantial and sufficient to maintain a head of said contact mass to prevent upward flow of gaseous fluids in said conduit, an inlet and outlet in said stripping section for stripping medium to strip the contact mass in said stripping section, an outlet for said stripping section for the removal of stripped contact material therefrom, said contacting and stripping sections being radially disposed about said contact mass transfer conduit in the lower portion of said shell, and the upper ends of said stripping sections being closed by the upper ends of the said contacting and stripping sections.

18. The conversion of a plurality of stocks employing a separate catalyst stream within separate sections in a common zone until each stock has been given a desired separate conversion at a desired temperature, and then combining the catalyst and stock streams for further conversion in a fluidized bed within a common section of said zone following which the catalyst and converted stocks are separated by transferring catalyst downwardly as a confined columnar mass connecting said common conversion section with separate stripping sections within said zone while maintaining a sufficient head of said catalyst in said confined columnar mass to prevent stripping medium employed within said stripping section from entering into said transfer section, said catalyst being a fluent particulate solid, and removing said converted stocks from said bed and said zone separately from said stripping medium.

19. A vessel suitable for the conversion of hydrocarbons employing a subdivided particulate contact mass which comprises a shell, a first outlet at the top of said shell, at least one closed contacting section within a lower portion of said shell, an inlet to said contacting section, at least one closed stripping section within a lower portion of said shell, a contact mass transfer conduit connecting a first point in an upper portion of said shell, which point is higher than any point in said closed stripping section, with a lower second point in said stripping section, a vertical distance between said connected points being substantial and sufficient to maintain a head of said contact mass to prevent upward flow of gaseous fluids in said conduit, an inlet and a second outlet in said stripping section for stripping medium to strip the contact mass in said stripping section, a third outlet for said stripping section for the removal of stripped contact material therefrom, a substantially horizontal foraminous fluid distributing means extending across said shell and forming the top closure of said at least one closed contacting section, the foraminous fluid distributing means defining and terminating the bottom of said upper portion of said shell and the openings therein connecting said contacting section with said upper portion.

References Cited in the file of this patent

UNITED STATES PATENTS

| | | |
|---|---|---|
| 2,490,993 | Borcherding | Dec. 13, 1949 |
| 2,502,953 | Jahnig | Apr. 4, 1950 |
| 2,558,194 | Orescan | June 26, 1951 |
| 2,608,473 | Stephens | Aug. 26, 1952 |
| 2,613,173 | Kaasa | Oct. 7, 1952 |
| 2,615,796 | Peet | Oct. 28, 1952 |
| 2,617,708 | Peery | Nov. 11, 1952 |
| 2,710,279 | Siecke | June 7, 1955 |
| 2,735,803 | Leffer | Feb. 21, 1956 |